HOLDER FOR GRAMOPHONE RECORDS, FILES, CARDS, AND THE LIKE

Filed Oct. 15, 1947 2 SHEETS—SHEET 1

INVENTOR.
Giuseppe Gallia
BY
Haseltine, Lake & Co.
AGENTS.

INVENTOR.
Giuseppe Gallia
BY
Haseltine, Lake & Co.
AGENTS.

Patented Dec. 2, 1952

2,619,966

UNITED STATES PATENT OFFICE 2,619,966

HOLDER FOR GRAMOPHONE RECORDS, FILES, CARDS, AND THE LIKE

Giuseppe Gallia, Turin, Italy

Application October 15, 1947, Serial No. 779,924
In Italy October 31, 1946

4 Claims. (Cl. 129—16.1)

This invention relates to a holder for flat articles, equal or similar in shape to one another, such as gramophone records, files, cards, or the like of the type in which said articles are arranged in juxtaposed relationship in a device of the rack-type.

In a holder of the conventional type, each article is identified by an identification formed by a numeral, a letter or a combination of numerals and letters or the like, and its location in the holder is similarly identified. Hence, locating the article in the holder and replacing it after use implies attention and time, the latter operation being particularly tedious when the articles to be fitted in the holder are numerous and unsorted.

With the holder according to my invention, these operations are considerably expedited, as any article, whichever its identification may be, may be located at any place in the rack which does not carry any identifications or signs distinguishing the various locations. The rack is merely provided for supporting the articles, but not for classifying them, and the articles are fitted in bulk while for removal they are selected by means of a keyboard including a small number of keys, which reproduces in numerals, letters, combination of numerals, letters, etc., the identification of the article to be removed.

The selected articles may thus be withdrawn directly by means of an extractor, one extractor serving for all the articles.

According to my invention, each article, for instance a gramophone record, is associated with an electrical circuit including two or more metal plates arranged on a portion of the periphery of the article, and of which the reciprocal position corresponds to the identification of the record (each of them corresponding to a numeral, letter or the like).

Conducting bars insulated with respect to one another are provided along the plane on which said peripheral portion bears, the bars being equal in number to the signs or group of signs forming the identifications of the records, a wire with a key switch abutting each bar. By actuating a key, its associated bar and the plate bearing thereon are connected in the circuit of a gramophone record. By actuating two or more keys forming the identification of the selected record, the electric circuit of the said record is closed by electrically actuating a device adapted to prepare the said record for removal from the rack directly or by means of the above mentioned extractor.

The principle set out above may be carried out in various manners by a person skilled in the art.

In the accompanying drawings, Figures 1 to 6 show the invention used in connection with a holder for about one hundred records to be selected by means of about twenty keys.

Figures 1, 3, 4, 7, 8:
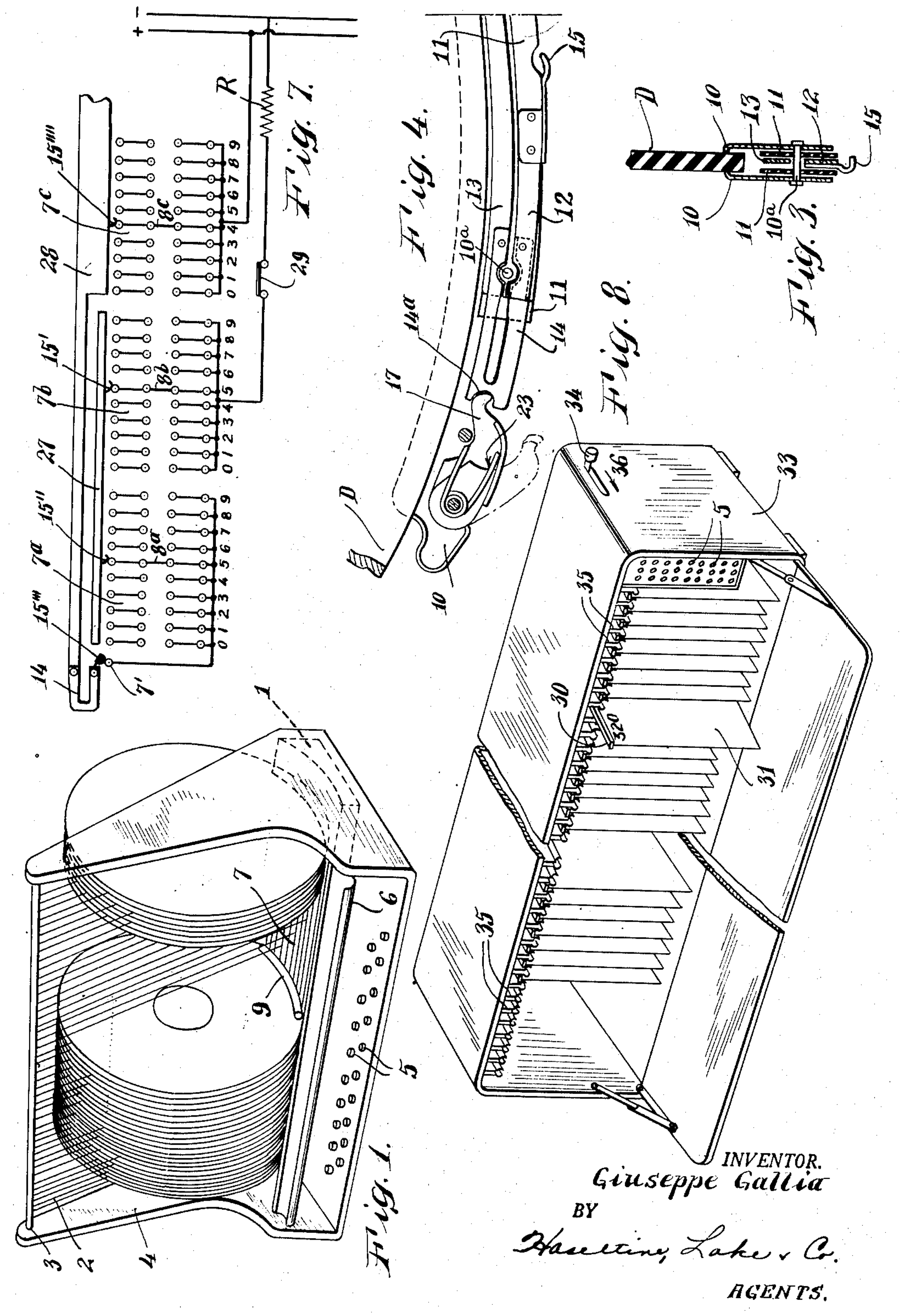
Figure 1 is a perspective view of the holder.
Figure 3 shows on an enlarged scale an axial section of a record.
Figure 4 shows on an enlarged scale a detail in two different positions with some parts removed.
Figure 7 shows the electrical diagram for a holder containing about one thousand records.
Figure 8 is a perspective view of a modification of my invention in connection with a card holder.

The holder is in its general aspect (Fig. 1) similar to the well-known type made up of a bedplate 1 subdivided after the manner of a rack into as many compartments as there are records to be filed, for instance by means of partitions, diaphragms or wires 2 stretched between the bedplate and a rail or runner 3 extending above, held by two light side walls 4 on both sides of the bedplate. The records may be placed very close to each other, as it will not be necessary for the user to introduce his fingers between two consecutive records for the purpose of gripping them. The support 1 is, in the example shown, of insulating material and is formed with a concave cylindrical supporting surface 7 matching the curvature but by a slightly increased diameter, of the records resting thereon. In the case of cards or the like, the surface is made flat.

The holder is provided in front of the bedplate 1 with a keyboard 5 which may even be located elsewhere on the holder, and a shaped extractor bar 6 which will be dealt with hereinafter. The records are moved as usual transversely from the front to the rear when replaced in the holder, the latter operation being started by actuation of the bar 6.

As mentioned above, the example shown relates to a holder for a hundred records, which are assumed to be distinguished by identifications consisting of two figures from 00 to 99. The keyboard is formed of two rows of ten keys each, distinguished by numerals 0 to 9. The two sets may be in series or, preferably, one above the other and in a slightly staggered relationship, so that almost all the identifications thereon may be formed by two fingers of the same hand. The keyboard may be of other form, such as for instance that of a dial for telephone calls.

Figure 2:
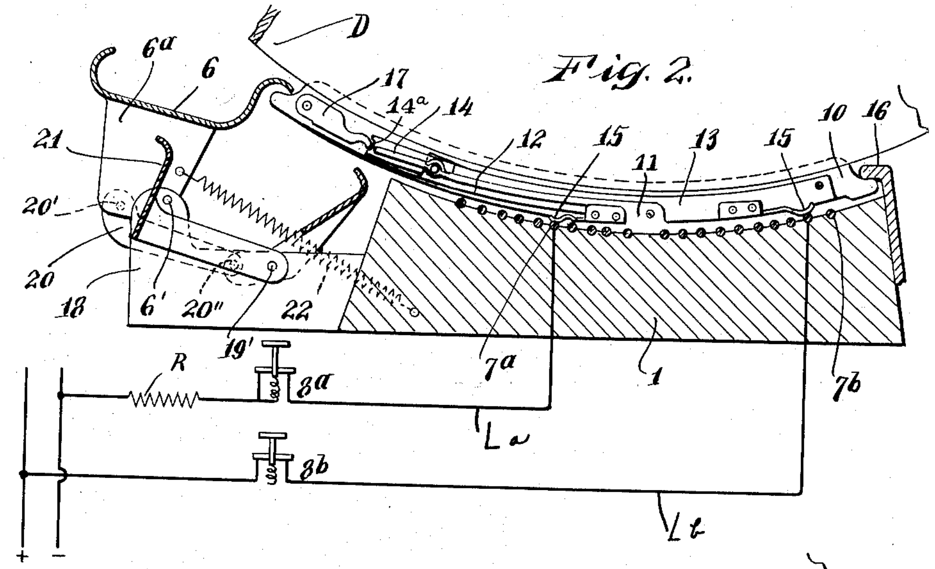
Figure 2 is a section of the holder perpendicular to the axis of the records, with some parts removed.

Twenty conducting bars are arranged along the bed plate 1, on the upper face (Fig. 2), the first ten bars 7*a* corresponding to one row of numerals on the keyboard, the further ten bars 7*b* corresponding to the other row. The bars project slightly from the concave cylindrical surface. They are insulated from the bedplate and from one another. Each of the first ten bars 7*a* is individually connected by a lead L*a* with one of the wires of an electric supply line, and each of the further ten bars is individually connected by a lead L*b* to the other side of the line, an actuating push-button 8*a* or 8*b* being inserted in each lead L*a* and L*b*. In the drawing, Figure 2 shows only one lead L*a* or L*b*, but it will be understood that each of the bars 7*a* and 7*b* is connected to the supply line by a lead and push button.

Each record is provided on its periphery with a light curved case, which does not affect its manipulation or use on the gramophone, and is adapted to cooperate with the bars 7*a* and 7*b* for closing the record circuit the identification of which corresponds with the keys that have been actuated, and bars acted upon thereby.

The case 9 is comprised of two thin metal plates 10 (Fig. 3) facing each other and clamped together by means of two rivets 10*a*, and it resiliently engages the record D. The plates hold through two insulating sheets 11, two conducting plates 12 and 13, which extend over the first mentioned ten bars 7*a* and over the second mentioned ten bars 7*b*, respectively. The two conducting plates 12 and 13 are connected together by means of a bimetallic plate 14 which, on heating upon closure of the circuit, bends laterally. Each plate 12 and 13 carries a spring tongue 15 bearing against one of the two bars 7*a*, 7*b*, respectively, according to its position on the plate, the position of both tongues corresponding to the identification of the record carrying the extension. The correct position of the extension of each record on the support is determined by the check bar 16 (Fig. 2) positioned on the back of the support and by the bar 6 of the extractor which will be described hereinafter, which clamps all the records.

The bimetallic plate 14 engages by a tooth 14*a* the end of the pawl 17 (Fig. 4), acted upon by a spring 23 which is left free as soon as the plate 14 bends sideways as a result of the electric current flowing therethrough.

The extractor consists of a shaped sheet steel bar 6, articulated by its flanges 6*a* to the pins 6′ of the end projections 18 on the support 1 (Fig. 2). The projections 18 have articulated thereto at 19′ a further bar 19 (Figs. 5 and 6), connected to the bar 6 by means of two links 20. The hinge pins 6′ and 19′ of the bars and 20′ and 20″ of the links are arranged in such manner that the action of a spring 22, in a manner known per se, causes the unit to remain in either of the two stable positions shown in Figure 2 or 5. On rocking from one position to the other the bar abuts the pawl 17 (Fig. 5) released by the bimetallic plate 14, carrying out of the rack the record which may be easily seized and withdrawn.

Figures 5, 6:
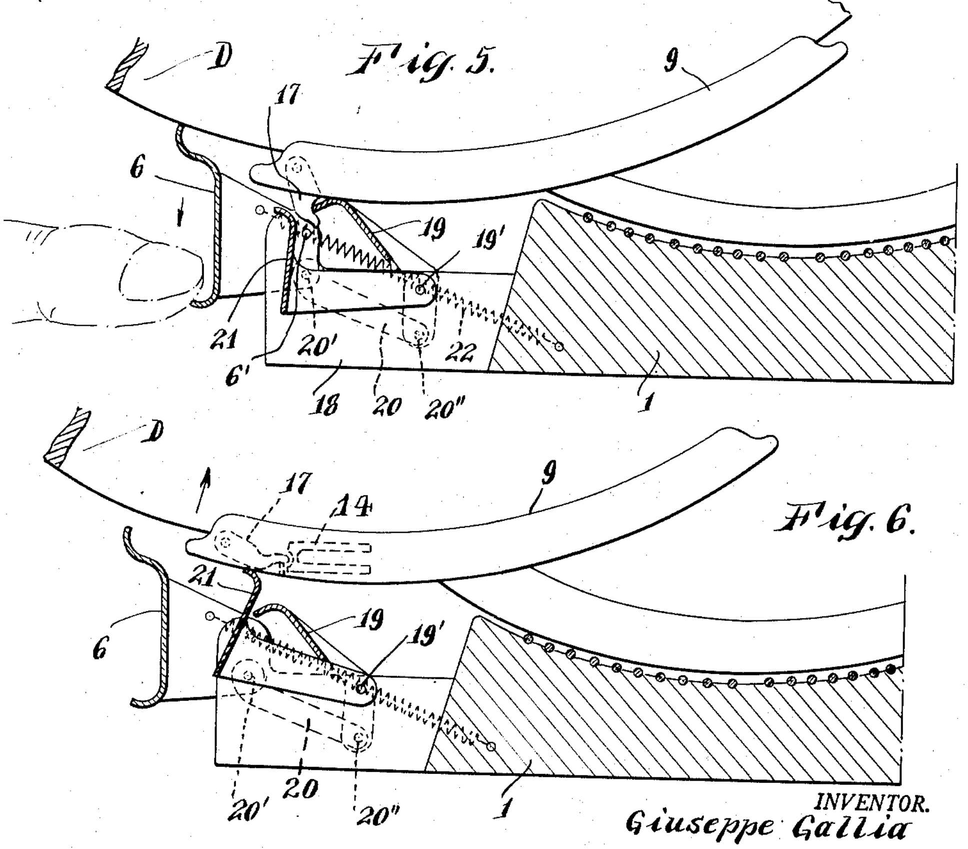
Figures 5 and 6 are cross sectional views showing the operation of the extractor.

The device operates in the following manner. When it is desired to remove the record identified by numeral 58, the keys 5 of the first row and 8 of the second row are simultaneously depressed, closing the switches 8*a* and 8*b*. The current flows from the line through the circuit of the record identified by the number 58, which includes switch 8*a*, rods 7*a*, tongue 15 of the plate 12, plate 12, bimetallic plate 14, plate 13, tongue 15 of the plate 13, rod 7*b* and switch 8*b* back to the line. The bimetallic plate 14 bends on flow of the current and releases the pawl 17 of the extractor. The bar 6 is then rocked by a finger on the pins 6′ and the record 58, whichever its location on the support 1 may be, is moved out of the rack to the position in which it is easily seized (Fig. 5).

The record is replaced in the holder in any suitable position. The pawl 17, unless already returned by hand to the position of engagement with the tooth 14*a*, is brought back to that position by reverse operation of the bar 6 and engagement of bar 19 with the heel of the pawl. Alternatively, the extractor mechanism may include a third bar 21, similarly hinged at 19′ to the projections 18, for returning the pawl 17 at the same time as the record is removed. The selected record falls unto this bar, which is subjected to the action of a light spring (not shown) and by removing its case 9, the record slides thereon automatically returning the pawl to its re-entered position (Fig. 6).

A very weak current of short duration is sufficient for bending the bimetallic plate 14; the main voltage for this use may be lowered by means of a small transformer or, considering the rare and very short use, by means of a resistance R connected in the circuit between the keyboard and line.

As mentioned above, the principle according to this invention consists in selecting a record by actuation of a keyboard to close an electric circuit through two or more bars forming the supporting plane for the records and the plates provided on the record, both corresponding for their reciprocal position to the identification of the records. Such a device is easy to construct in different manners by one skilled in the art. The use of the bimetallic plate will be found particularly useful in construction.

Figure 7 shows an electric diagram of a holder for about one thousand articles (records, files, cards, etc.) similar in construction to the holder described above. The articles are identified by signs composed of three elements, for instance three numerals, from 000 to 999. In this case, the bars 7 are thirty in number and arranged in three rows of records 7*a*, 7*b* and 7*c*, and the keyboard counter will comprise thirty switches in three rows of ten 8*a*, 8*b* and 8*c*. The three tongues 15′, 15″ and 15″″ on each article, corresponding by their location to the identification, are carried by the plates 27, 28 which are connected in series with the bimetallic leaf 14 by closure of the three switches forming the identification of the selected articles, which in the example shown is the numeral 554.

Each circuit is provided with a supplementary tongue 15‴ connected to the bi-metallic plate 14 and resting on a supplementary bar 7′ of the first row of bars.

In the embodiment shown in Figure 7, the current flows from the positive side of the line to switch 8*c* and bar 7*c*, thence through tongue 15″″ to plate 28 and element 14 which is connected by tongue 15‴ to bar 7′. From bar 7′ the current flows to switch 8*a* and bar 7*a*, and thence through tongue 15″, plate 27 and tongue 15′ to bar 7b and switch 8a from which it returns to the negative side of the line.

It is also possible to include in the device a switch which remains closed as long as the three switches 8a, 8b and 8c are closed, and which automatically reopens the circuit at a predetermined time, for instance through a bimetallic leaf 29 connected in the feed circuit. It will be easy to one skilled in the art to design similar circuits for identifications made up of five or more signs (numerals, letters, combinations of numerals and letters, etc.) and mechanisms similar to those described, without departing from the scope of this invention.

In the modification shown in Figure 8, 33 denotes a cabinet having a keyboard 5 and adapted to contain a set of juxtaposed cards 31, each provided with a metal plate 30, having the same function as the cases 10 described in the previous example. The only difference from the previously described construction resides in the fact that the articles contained in the cabinet, cards in this case, instead of resting at their lower end on a support 7 are suspended at their upper end which is provided with the plate 30, the said plate fitting into one of the inverted grooves 35 formed in the cabinet, the grooves being narrower at their lower, open ends than the width of the plates 30.

For displacement of the card towards the outside when it has been selected by means of the keyboard 5, a hand lever 34 is actuated in the direction of arrow 36.

It will be understood that each of the plates 30 is equipped with a movable element similar to pawl 17 which extends into the path of movement of lever 34 when released by closing the associated circuit. Lever 34 extends across the whole width of the cabinet 33 and will, therefore, in its movement in the direction of arrow 36, displace forwardly any one or more of the cards 31, the pawls 17 of which have been actuated by selection of appropriate buttons on the keyboard 5.

What I claim is:

1. In a holder for relatively thin, aligned articles of similar shape, having a casing and means retaining the articles in juxtaposed relationship in the casing, a mechanism for individually selecting and advancing the articles to be removed from the holder, said mechanism comprising, in combination, an identification circuit on each article, a keyboard having keys adapted to be actuated in accordance with a code identifying any one of the circuits, a support surface for the articles in the casing, a plurality of circuits in the support surface, means connected to each article and inserted in the circuit thereof and connectible, upon insertion of the article in the holder, with a given one of the circuits in the support surface, retractible means connected to each article, means inserted in the circuit of each article for retaining the retractible means in retracted position when no current flows through the selected circuit and responsive to current flow therethrough to release the retractible means to operative position, and extractor means mounted on the holder and engageable with the retractible means when in operative position to displace the selected article from alignment with the other, non-selected articles in the holder.

2. In a holder as in claim 1, the retractible means comprising a spring-urged pivoted pawl and the means retaining the pawl in retracted position comprising a bi-metallic member normally engageable with the pawl and disengageable therefrom upon flow of current through the selected circuit.

3. The combination claimed in claim 1 further comprising a peripheral casing resiliently clamped to a marginal portion of each article and supporting the circuit and the retractible means thereof, and stop means on the holder engageable with the peripheral casing to determine correct alignment of the article in the holder.

4. The combination claimed in claim 1 further comprising a setting bar having means abutting against the retractible means of each article when in operative position and actuatable, when the article is extracted, to return said retractible means to retracted position.

GIUSEPPE GALLIA.

No references cited.